(12) United States Patent
Hammond et al.

(10) Patent No.: US 7,408,463 B2
(45) Date of Patent: Aug. 5, 2008

(54) RADIO FREQUENCY IDENTIFICATION TAG

(75) Inventors: William A. Hammond, Olympia, WA (US); Theodore L. Willke, Tacoma, WA (US); Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 11/239,362

(22) Filed: Sep. 30, 2005

(65) Prior Publication Data

US 2007/0075139 A1 Apr. 5, 2007

(51) Int. Cl.
*G08B 13/14* (2006.01)

(52) U.S. Cl. ............. 340/572.1; 340/572.4; 340/572.8; 340/10.34; 340/10.5; 235/435; 235/492

(58) Field of Classification Search .............. 340/572.1, 340/572.4, 572.8, 10.34, 10.5; 235/435, 235/492
See application file for complete search history.

(56) References Cited

U.S. PATENT DOCUMENTS

| 5,423,086 | A | * | 6/1995 | Cannon et al. ........... 455/186.1 |
| 6,895,147 | B2 | | 5/2005 | Posamentier |
| 2002/0118111 | A1 | | 8/2002 | Brown et al. |
| 2003/0081666 | A1 | * | 5/2003 | Nah ........................... 375/222 |
| 2004/0188531 | A1 | | 9/2004 | Gengel et al. |
| 2004/0262491 | A1 | | 12/2004 | Posamentier et al. |
| 2004/0264523 | A1 | | 12/2004 | Posamentier et al. |
| 2004/0264876 | A1 | | 12/2004 | Posamentier et al. |
| 2004/0264881 | A1 | | 12/2004 | Posamentier et al. |
| 2005/0099269 | A1 | | 5/2005 | Diorio et al. |
| 2005/0156039 | A1 | | 7/2005 | Carrender et al. |
| 2005/0161503 | A1 | | 7/2005 | Remery et al |
| 2005/0200528 | A1 | | 9/2005 | Carrender et al. |
| 2005/0280511 | A1 | * | 12/2005 | Yokoyama et al. ......... 340/10.5 |
| 2006/0017962 | A1 | * | 1/2006 | Burdette et al. ............ 358/1.15 |

OTHER PUBLICATIONS

William A. Hammond; "RFID and It's Impact on Servers," Date Unknown.

* cited by examiner

*Primary Examiner*—Tai T Nguyen
(74) *Attorney, Agent, or Firm*—Ked & Associates, LLP

(57) ABSTRACT

Embodiments of a radio frequency identification tag are generally described herein. Other embodiments may be described and claimed.

5 Claims, 6 Drawing Sheets

RADIO FREQUENCY IDENTIFICATION TAG

FIELD

Embodiments of the present invention may relate to radio frequency devices and/or radio frequency identification (RFID) tags.

BACKGROUND

Goods and other items may be tracked and identified using a radio frequency identification (RFID) system/device. The RFID system may include an RFID tag that is placed on the item (such as a product) to be tracked. The RFID tag may be a small transponder that can be read by an RFID reader (or interrogator). The RFID reader may include a transceiver and an antenna. The antenna may emit electromagnetic (EM) waves generated by the transceiver, which, when received by the RFID tag, activates the RFID tag. Once the RFID tag has been activated, the RFID tag may modify and reflect the waves back to the RFID reader, thereby identifying the item to which the RFID tag is attached or is otherwise associated with.

The RFID reader may be a hand held or stationary device that transmits a radio signal that may be intercepted by the RFID tag. When the RFID tag passes through the radio waves, the RFID tag detects the signal and is activated. Data encoded in the RFID tag may then be transmitted to the RFID reader for further processing. This type of system allows for quick and easy identification for a large number of items by simply passing them through the scope of an RFID reader. This type of system may also identify items on which the RFID tag is not exposed, such as items in which the tag is located internally. Further, the RFID reader may read multiple tags very quickly, such as items passing by the RFID reader while the items are on a conveyer belt, for example.

There are at least three basic types of RFID tags, namely a beam-powered RFID tag, a battery-powered RFID tag and an active RFID tag. The beam-powered RFID tag is a passive device that receives energy required for operation from the radio waves generated by the RFID reader. The beam-powered tag rectifies an EM field and creates a change in reflectivity of the field that is reflected to and read by the RFID reader. The battery-powered RFID tag may receive and reflect EM waves from the RFID reader. However, the battery-powered RFID tag may include a battery to power the RFID tag. Additionally, the active tag may actively transmit EM waves that are then received by the RFID reader.

BRIEF DESCRIPTION OF THE DRAWINGS

The foregoing and a better understanding of embodiments of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION

Figure 1:
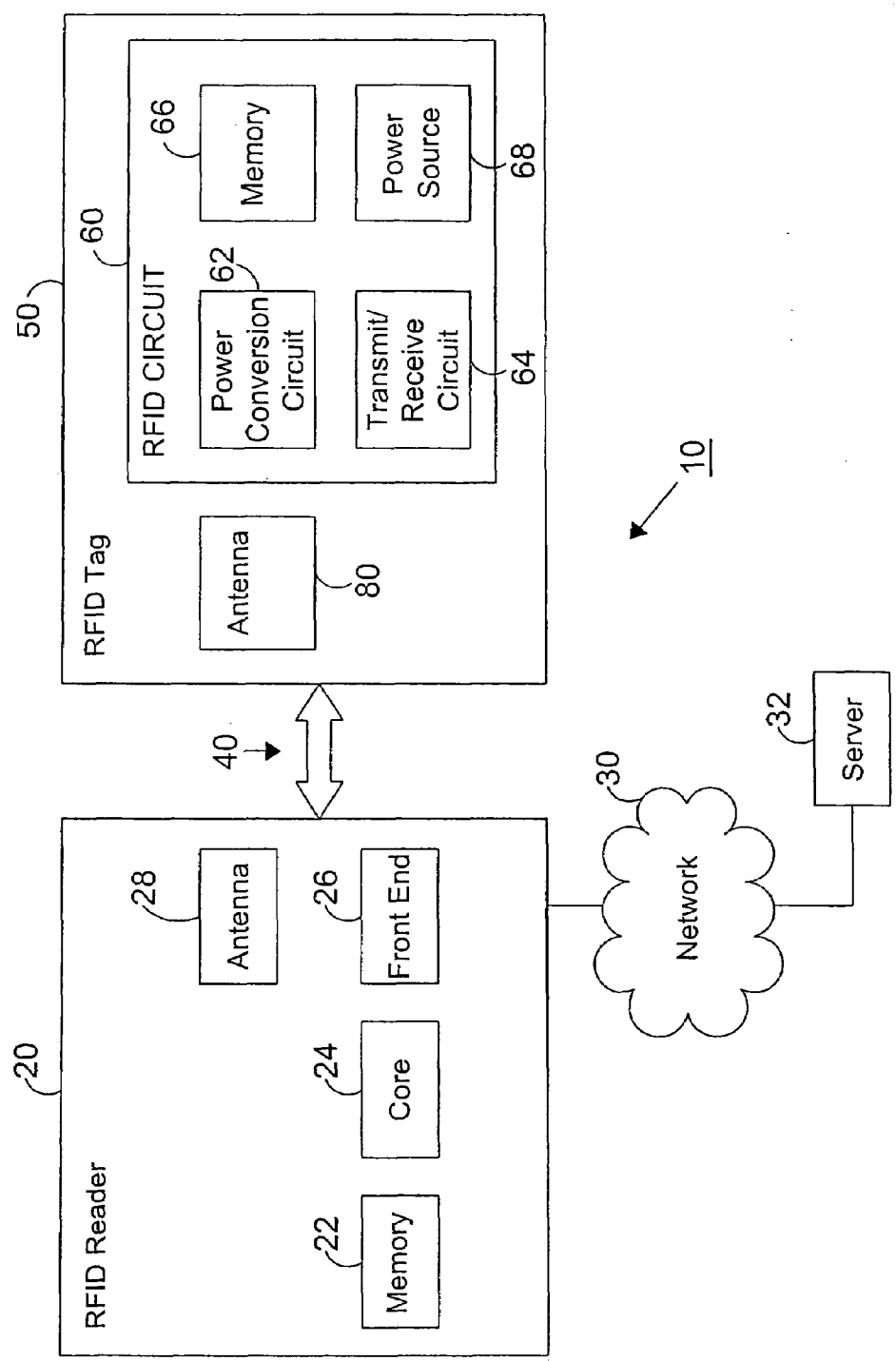
FIG. 1 shows an RFID system according to an example arrangement.

In the following detailed description, like reference numerals and characters may be used to designate identical, corresponding or similar components in differing figure drawings. Further, in the detailed description to follow, example sizes/models/values/ranges may be given although the present invention is not limited to the same. Where specific details are set forth in order to describe example embodiments of the invention, it should be apparent to one skilled in the art that the invention can be practiced without these specific details.

FIG. 1 shows an RFID system according to an example arrangement. Other arrangements are also possible. More specifically, FIG. 1 shows an RFID system 10 that includes an RFID reader 20 and an RFID tag 50. While not shown, the RFID system 10 may also include a number of other RFID tags, which may be similar or different than the RFID tag 50. The RFID reader 20 may transmit information via a wireless air interface 40 to the RFID tag 50. The air interface 40 enables the RFID reader 20 to provide power, query data and/or timing information to the RFID tag 50 so that the RFID tag 50 may provide response data. Specifically, the RFID tag 50 may scavenge power from a received radio-frequency (RF) signal, and may backscatter the response data to the RFID reader 20 by modulating an impedance of an associated antenna. For example, in a half-duplex communications arrangement, the RFID reader 20 may modulate an RF waveform with information (e.g., bits). During a tag-to-reader transmission, the RFID reader 20 may transmit a Continuous-Wave (CW) radio signal. The RFID tag 50 may then backscatter-modulate the CW signal with bits to create a radio-frequency (RF) information waveform that is transmitted back to the RFID reader 20.

The RFID reader 20 may include a memory 22 to store various algorithms and information, a core 24 (e.g., a controller or processor) to control operations of the RFID reader 20, and a front end 26, which is operatively coupled to an antenna 28, to control the transmission of information via the air interface 40 and also to process backscatter information received via the air interface 40 by the antenna 28.

The RFID reader 20 may be coupled (e.g., via a network 30) to a further processing system, such as a server 32. This may allow for programming and/or control of the RFID reader 20 by the server 32. Further, the RFID reader 20 may provide data, via the network 30, to the server 32 for a variety of purposes. For example, multiple RFID readers 20 may be coupled to a processing system, such as the server 32, so as to provide the server 32 with a comprehensive view of a particular environment. That is, multiple RFID readers 20 may be deployed at various locations within a warehouse. Each of the RFID readers 20 may be coupled via the network 30 (e.g., a wired and/or wireless network) to one of more servers 32, so as to provide a warehouse operator with RFID access to multiple locations within the warehouse, and/or across multiple warehouses.

The RFID tag 50 may include an RFID circuit 60 (e.g., an RFID Integrated Circuit (IC)), and an antenna 80 to facilitate reception and transmission of radio-frequency signals via the air interface 40. The RFID circuit 60 and the antenna 80 may be located on a base material or substrate (e.g., a plastic or paper material) to thereby constitute the RFID tag 50. The RFID tag 50 may include a number of subcomponents, any one or more of which may be implemented on one or more integrated circuits that form part of the RFID tag 50.

More specifically, FIG. 1 shows that the RFID circuit 60 includes a power conversion circuit 62, a transmit/receive circuit 64, and a memory 66. As described in detail below, the RFID circuit 60 may also include a power source 68. The RFID circuit 60 includes components to facilitate the processing of RF signals received via the antenna 80 and also to facilitate the transmission of an RF signal (e.g., a modulated backscatter signal) via the antenna 80. The memory 66 may store a tag identifier, a product identifier, configuration values applicable to configuration of the RFID tag 50, one or more algorithms, and/or other suitable information. As noted above, the RFID tag 50 may be a "passive" tag that scavenges power from an RF signal received via the air interface 40. Alternatively, the RFID tag 50 may be an "active" tag and include the power source 68 to power the RFID tag 50.

The air interface 40 may facilitate both full and half duplex communications, for example. Further, while arrangements and embodiments are described herein as utilizing RF signals to communicate, other forms of wireless communication across the air interface 40 may be utilized. For example, in various embodiments, coupling between the RFID reader 20 and the RFID tag 50 may be achieved utilizing inductive coupling, close coupling, or electrical coupling.

Embodiments of the present invention may include an RFID tag that includes at least an antenna, an auxiliary interface device and a dual-ported non-volatile memory device. The antenna may send and receive data across a wireless interface. The auxiliary interface device may couple with an apparatus external to the RFID tag, such as a server or computer. Additionally, the non-volatile memory device may include at least a first port associated with the antenna and a second port associated with the auxiliary interface device, such as input/output (I/O) pins. The auxiliary interface device may include a communication link to communicate data information to and from the memory device and a power link to provide power to the RFID tag. The RFID tag may communicate data over a wireless interface using the antenna or a wired interface through the auxiliary interface device.

Figure 2:
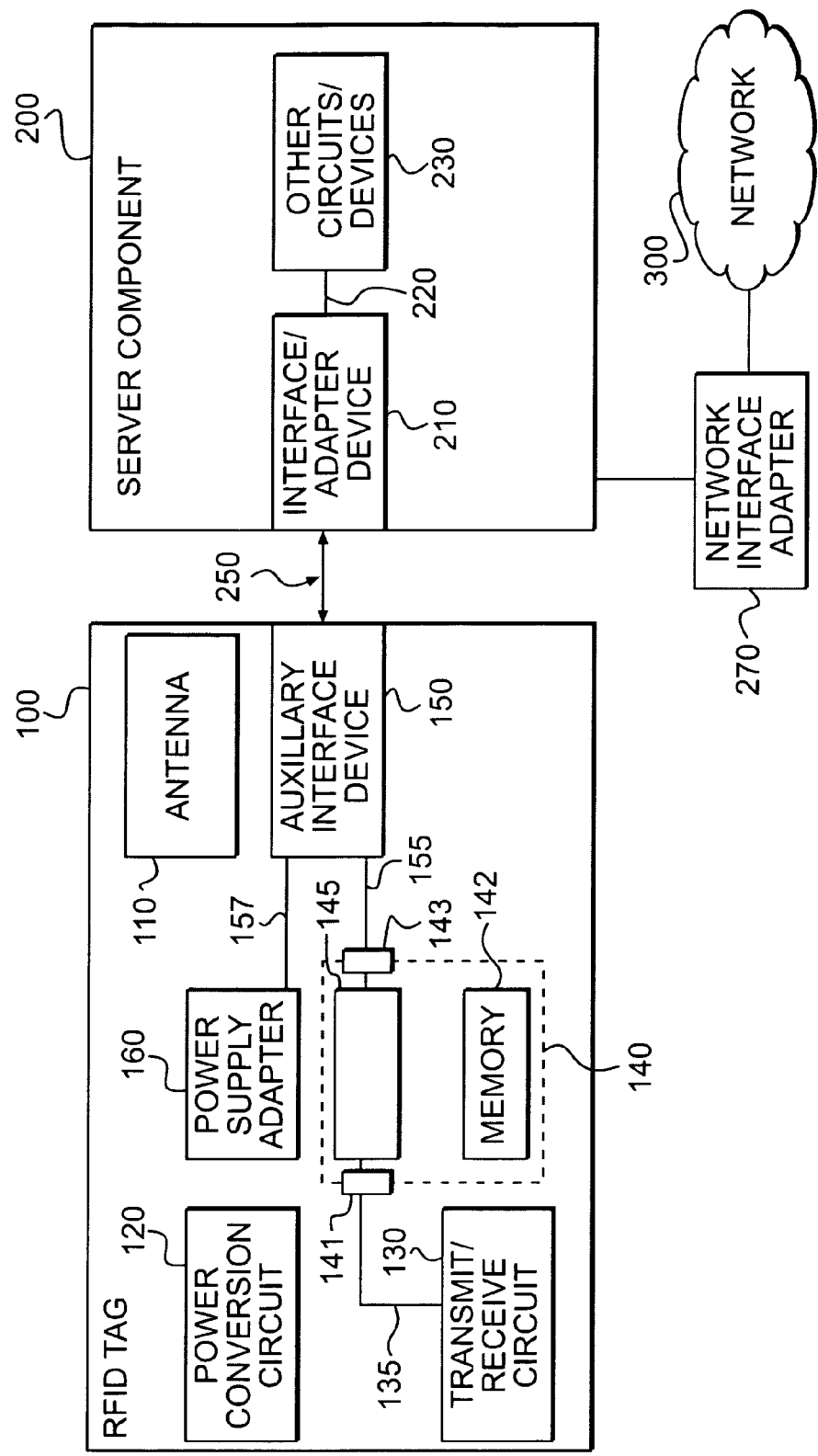
FIG. 2 shows an RFID system according to an example embodiment of the present invention.

FIG. 2 shows an RFID system according to an example embodiment of the present invention. Other embodiments and configurations are also within the scope of the present invention. More specifically, FIG. 2 shows an RFID tag 100 and a server component 200 that are coupled together by a wired interface 250 (such as a bus interface). In this context, the wired interface relates to a physical connection between two entities, such as by wires, cables, a bus, etc. Both the RFID tag 100 and the server component 200 may be provided together within one server chassis, for example. Alternatively, the server component 200 may be a server chassis and the RFID tag 100 may be coupled to the server component 200 either within the chassis or external to the chassis. Although not specifically shown in FIG. 2, a RFID reader (such as the RFID reader 20 in FIG. 1) may also be considered as part of the RFID system. Such an RFID reader may send and receive signals via an air interface with an antenna 110 of the RFID tag 100. As one example, the antenna 110 may be coupled to allow communication with an RFID reader located external to a server chassis.

The RFID tag 100 may include the antenna 110, a power conversion circuit 120, a transmit/receive circuit 130, a memory device 140 and an auxiliary interface device 150. The RFID tag 100 may also include a power supply adaptor 160 that is coupled to the auxiliary interface device 150 so as to obtain power for the RFID tag 100 when the RFID tag 100 is physically coupled to the server component 200 via the wired interface 250. Other components and circuits may be provided on the RFID tag 100 but are not discussed herein for ease of illustration and discussion. The antenna 110, the power conversion circuit 120, the transmit/receive circuit 130, the memory device 140, the auxiliary interface device 150 and the power supply adaptor 160 may be provided on an RFID IC. While FIG. 2 separately shows power conversion circuit 120 and power supply adaptor 160, both features may be provided as one component. The same may also apply to other features in the figures.

As shown, the memory device 140 may be a dual-ported memory device that includes a non-volatile memory 142 and a dual-ported multiplexer 145 (or memory controller). As one example, the memory 142 may be a random access memory (RAM). Thus, the memory device 140 may be referred to as a dual-port non-volatile random access memory device and/or a dual-port non-volatile random access memory. Although the above example describes a particular type of memory device, the methods and apparatus described herein may use other suitable memory devices.

The power conversion circuit 120 may receive a signal from the antenna 110 and convert the signal into electric energy. The electric energy may be used to power the non-volatile memory 142, for example, when needed. Stated differently, the power conversion circuit 120 may create direct current (DC) power from an external radio frequency signal. The transmit/receive circuit 130 may control operations of the RFID tag 100. For example, the transmit/receive circuit 130 may receive signals from the antenna 110 and perform a conversion (e.g., analog to digital) of the signals. These signals may be provided on a link 135 to access data in the memory device 140 (i.e., in the memory 142).

The memory device 140 may include at least two ports and thus may be considered a dual-port non-volatile memory device. Other numbers of ports greater than one may also be provided as part of the memory device 140. Thus, the memory device 140 may include the dual-ported multiplexer 145 (or memory controller) that receives signals along the link 135 (from the transmit/receive circuit 130) and along a link 155 (from the auxiliary interface device 150). The dual-ported multiplexer 145 applies received signals to the memory 142 so as to access data. Likewise, the dual-ported multiplexer 145 may receive signals from the memory 142 and apply those signals along either the link 135 (to the transmit/receive circuit 130) or the link 155 (to the auxiliary interface device 150). A first port 141 of the memory device 140 may be used for accessing, sending and/or receiving data to/from the antenna 110. Thus, the first port 141 of the memory device 140 may be associated with the antenna 110 for transmission/reception via the air interface. A second port 143 of the memory device 140 may be used for accessing, sending and/or receiving data to/from the server component 200 via the wired interface 250. Thus, the second port 143 of the memory device 140 may be associated with the auxiliary interface device 150 for transmission/reception via the wired interface 250.

The auxiliary interface device 150 may include and/or be coupled to a communication link 155 to send/receive data to/from the second port of the memory device 140. The auxiliary interface device 150 may also include and/or be coupled to a power source link 157 to supply power to the power supply adaptor 160, which may in turn supply power to components of the RFID tag 100. The auxiliary interface device 150 therefore allows communication data to be communicated through the wired interface 250 in addition to data be communicated through the antenna 110 via the air interface. Additionally, the auxiliary interface device 150 allows the RFID tag 100 to be powered by the server component 200 (or other device coupled via the wired interface 250) in addition to receiving power over the air interface based on the signal received by the antenna 110.

In at least one embodiment, the server component 200 may be coupled via the wired interface 250 with the RFID tag 100 to provide communication signals and/or power signals. The server component 200 may include an interface/adaptor device 210 to couple the wired interface 250 with a bus 220 such as a system management bus (SMBUS) of the server component 200. Other circuits/devices 230 of the server component 200 are not discussed herein for ease of discussion. The wired interface 250 and the associated interface devices 150 and 210 may be any of a number of different configurations such as wires, cables, buses, etc. so as to communicate when properly attached and/or coupled to both the RFID tag 100 and the server component 200 (or other device or computer system). For example, the interface devices 150 and 210 and the wired interface 250 may be associated with I²C (Inter-IC) Bus, Serial Peripheral Interface (SPI), iWire, Memory Bus, etc.

The RFID tag 100 may be provided on or within a server chassis. That is, the onboard RFID tag 100 may be embedded at a board level within the server chassis and have antenna connectivity to outside the server chassis. The RFID tag 100 in such a configuration may provide specific information such as a server name, power up information (relating to sub-nets), etc.

The server (including the server component 200) may be coupled to a network interface adaptor 270, which in turn may be coupled to a network 300 such as a local area network (LAN), metropolitan area network (MAN), and/or a wide area network (WAN), for example. Other types of wired and/or wireless networks may also be provided as the network 300.

The wired interface 250 between the server component 200 and the RFID tag 100 allows the server component 200 to read from the memory device 140 when the RFID tag 100 is in a passive mode (and/or an active mode). That is, the server component 200 (located external to the RFID tag 100) may read data from the memory device 140 and across the auxiliary memory device 150 when the RFID tag 100 is in a passive mode or an active mode. Additionally, the wired interface 250 between the server component 200 and the RFID tag 100 also allows the server component 200 to write data to the memory device 140 when the RFID tag 100 is in a passive mode (and/or an active mode). That is, the memory device 140 may store (or write) data received from the auxiliary interface device 150 when the RFID tag 100 is in a passive mode.

Figure 3:
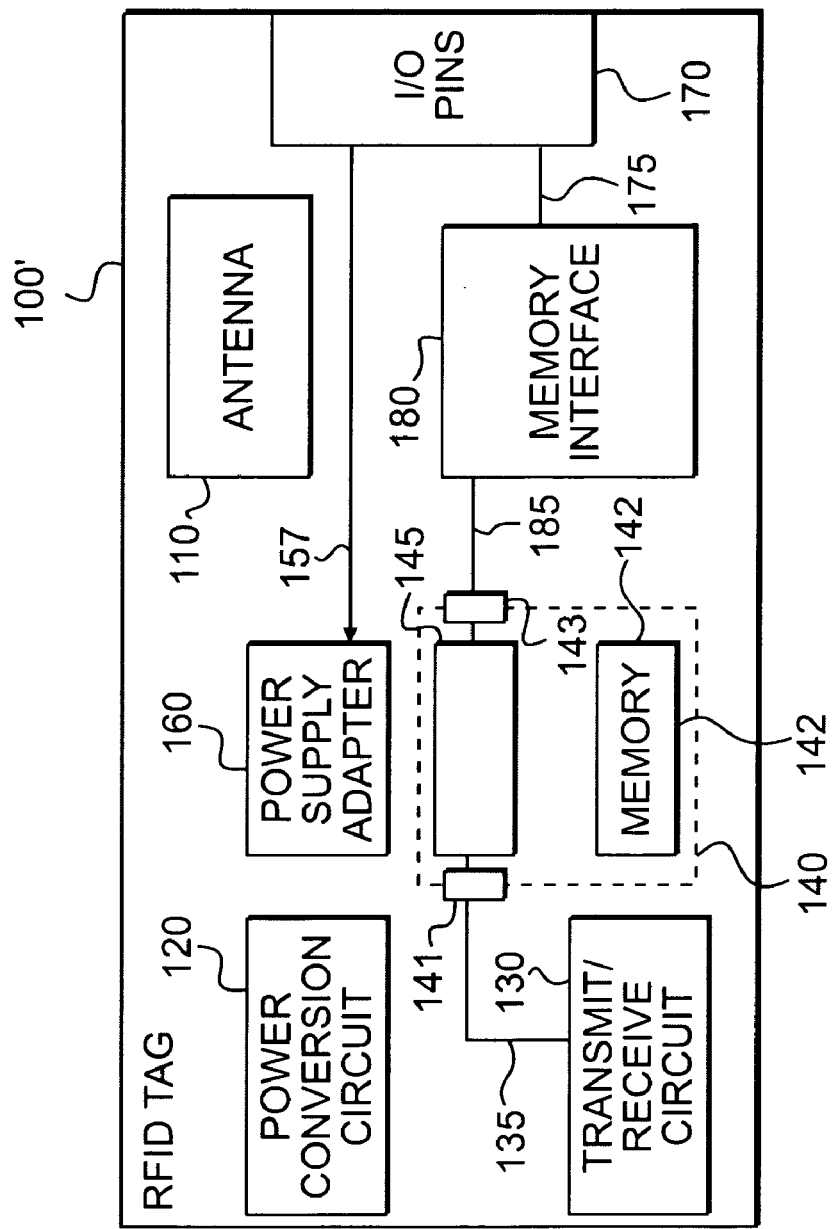
FIG. 3 shows an RFID tag for use in an RFID system according to an example embodiment of the present invention.

FIG. 3 shows an RFID tag for use in an RFID system according to an example embodiment of the present invention. Other embodiments and configurations are also within the scope of the present invention. More specifically, FIG. 3 shows an RFID tag 100'. Although not specifically shown in FIG. 3, the RFID tag 100' may be coupled to other components such as the server component 200 shown in FIG. 2 along the wired interface 250. The RFID tag 100' includes several similar components as in the RFID tag 100 shown in FIG. 2, and therefore these components will not be discussed again in detail.

The RFID tag 100' may include a set of input/output (I/O) pins 170 as the auxiliary interface device. The I/O pins 170 may be coupled by a communication link 175 to a memory interface 180. The memory interface 180 may be coupled to the memory device 140 by a communication link 185 so as to access locations within the memory 142. The memory interface 180 (and the link 185) may also be considered as part of the memory device 140. The memory interface 180 may generate signals (such as address signals, data signal, row and column address strobes, etc.) in order to access the specific locations within the memory 142.

Additionally, the power supply adaptor 160 may be a combination of diodes that have output sides connected so as to provide current isolation, such that power sources can operate independently or simultaneously. The power source link 157 may therefore receive a positive voltage (i.e., +V) from the I/O pins 170 and from the power conversion circuit 120, both being energized from a device/apparatus located external to the RFID tag 100'. While FIG. 3 separately shows power conversion circuit 120 and power supply adaptor 160, both features may be provided as one component. The same may also apply to other features in the figures.

Figure 4:
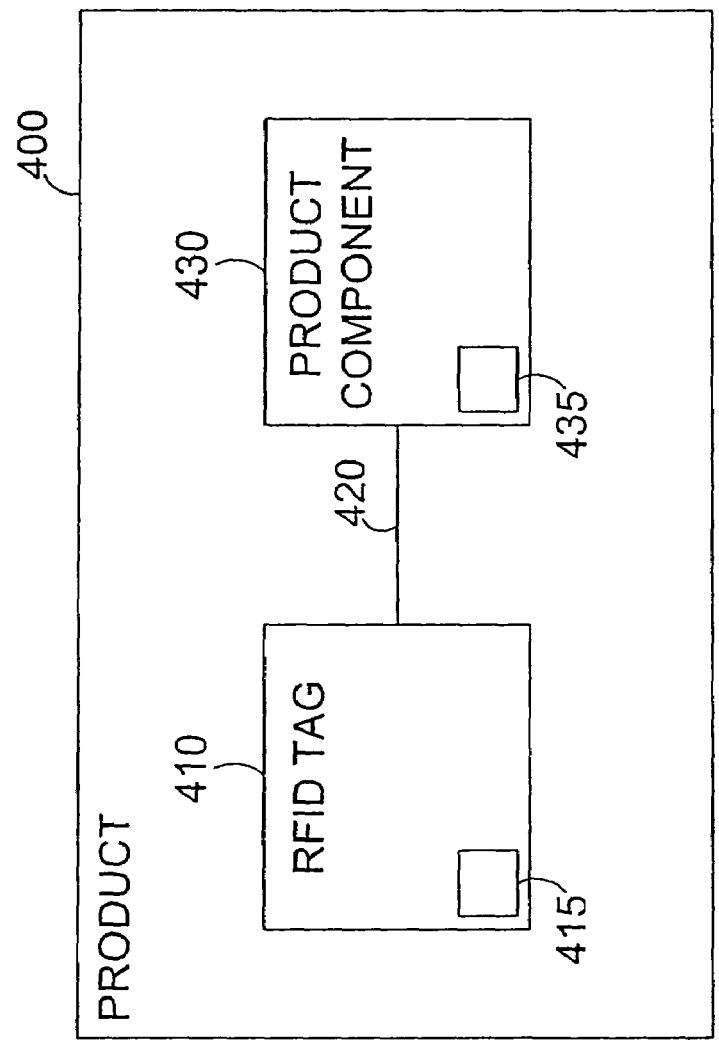
FIG. 4 shows a product having an RFID tag according to an example embodiment of the present invention.

FIG. 4 shows a product having an RFID tag according to an example embodiment of the present invention. More specifically, FIG. 4 show a product 400 that includes an RFID tag 410 and a product component 430 coupled by a wired interface 420. The product 400 may be any of numerous types of products, items, objects, etc. such as a server, a laptop computer, etc. The product 400 includes various components that allow the product to work such as various circuits, memories, processors, etc. As one example, FIG. 4 shows a processor 435 provided within the product component 430 such as a server component or computer component. In FIG. 4, the RFID tag 410 may be provided on or within the product 400 and be coupled to the product component 430 so as to allow communication between the RFID tag 410 and the product component 430. The RFID tag 410 may correspond with the RFID tag 100 shown in FIG. 2 and/or the RFID tag 100' shown in FIG. 3. The communication is enabled based on the wired interface 420 (or bus interface). The wired interface 420 may correspond with the wired interface 250 shown in FIG. 2. In a similar manner as discussed above, the product component 430 may also be coupled to a network and/or system so as to provide communication of information to the network and/or system. Likewise as discussed above, an antenna 415 of the RFID tag 410 may also communicate with an RFID reader (not shown in FIG. 4) via an air interface.

Figure 5:
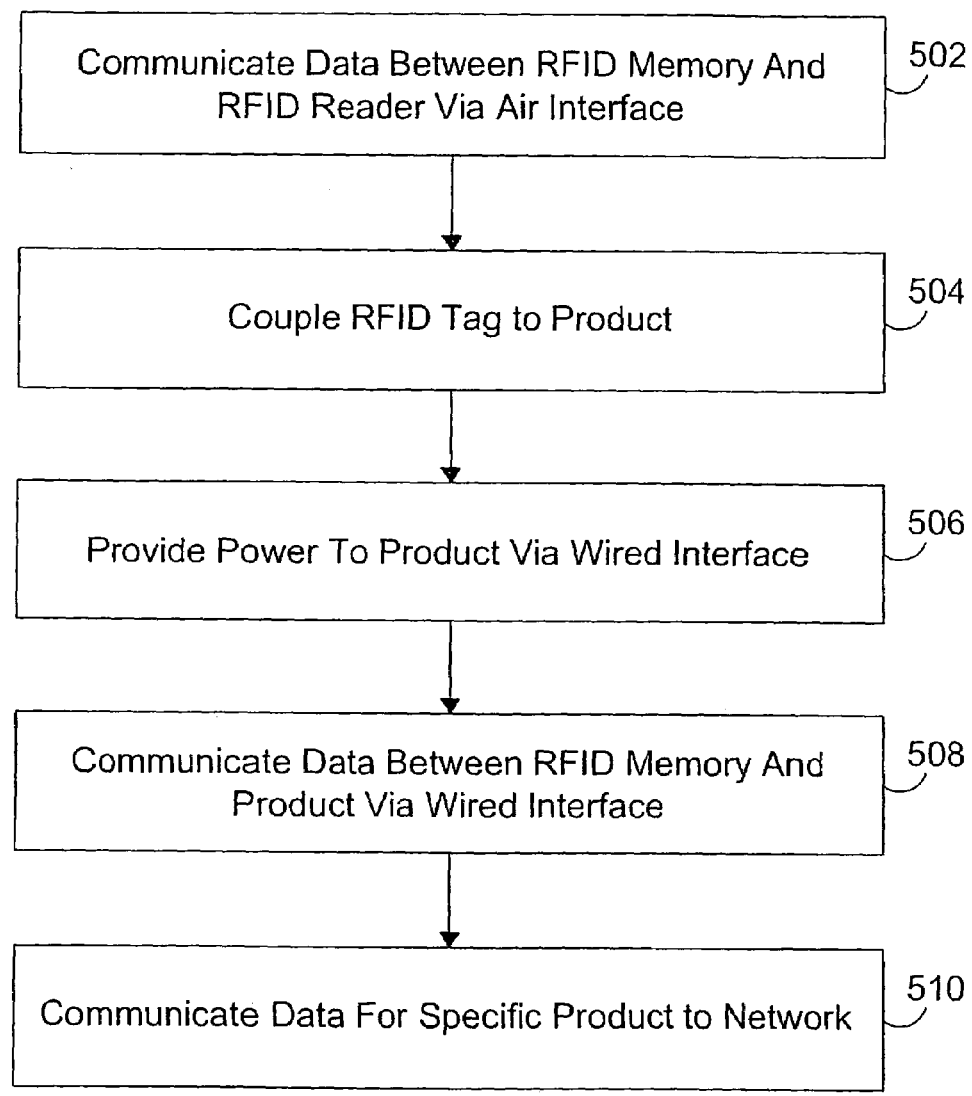
FIG. 5 is a flowchart showing operations of an RFID system according to an example embodiment of the present invention.

FIG. 5 is a flowchart showing operations of an RFID system according to an example embodiment of the present invention. Other operations, orders of operations, flowcharts and embodiments are also within the scope of the present invention. More specifically, FIG. 5 shows that data may be communicated between an RFID tag (i.e., an RFID memory) and an RFID reader via an air interface in block 502. The RFID tag may be coupled to a specific product (such as server or computer system) in block 504. Power may be provided from the specific product via a wired interface in block 506. Additionally, data may be communicated between the RFID tag (i.e., the RFID memory) and the specific product via the wired interface in block 508. In block 510, the data received at the specific product in block 508 may be communicated to a network/system for any of various reasons such a location determination, security, inventory, etc.

Figure 6:
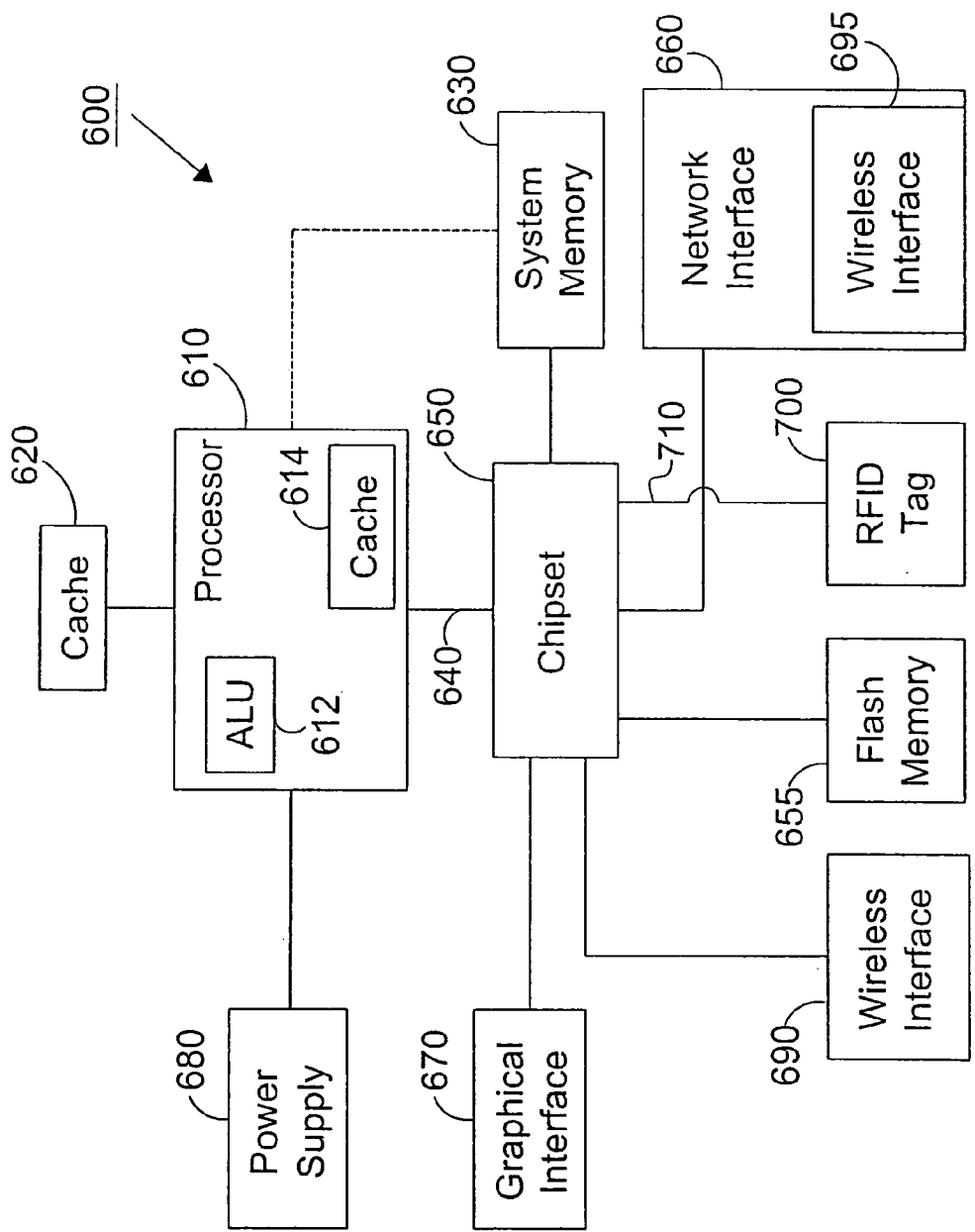
FIG. 6 is a block diagram of a system according to an example embodiment of the present invention.

FIG. 6 is a block diagram of a system (such as a computer system 600) according to an example embodiment of the present invention. Other embodiments and configurations are also within the scope of the present invention. More specifically, the computer system 600 may include a processor 610 that may have many sub-blocks such as an arithmetic logic unit (ALU) 612 and an on-die (or internal) cache 614. The processor 610 may also communicate to other levels of cache, such as external cache 620. Higher memory hierarchy levels such as a system memory (or random access memory RAM) 630 may be accessed via a host bus 640 and a chip set 650. The system memory 630 may also be accessed in other ways, such as directly from the processor 610 and/or without passing through the host bus 640 and/or the chip set 650. The system 600 may further include flash memory 655 and/or a peripheral interface to receive the flash memory 655. The flash memory 655 (and/or peripheral interface) may be coupled to the chipset 650. In addition, other functional units such as a graphical interface 670 and a network interface 660, to name just a few, may communicate with the processor 610 via appropriate busses or ports. The processor 610 may be powered by an external power supply 680. The system may also include a wireless interface 690 coupled to the chipset 650 (or to the processor 610) to interface the system 600 with other systems, networks, and/or devices via a wireless connection. Additionally, the system 600 may also include a wired interface 695. The wired interface 695 may be for communication with the RFID tag 700.

Additionally, an RFID tag 700 may be coupled to the processor 610 by a wired interface 710. The RFID tag 700 may correspond to the RFID tag 100 shown in FIG. 2, the RFID tag 100' shown in FIG. 3 and/or the RFID tag 410 shown in FIG. 4. The wired interface 710 may correspond to the wired interface 250 shown in FIG. 2 and/or the wired interface 420 shown in FIG. 4. Accordingly, the RFID tag 700 may be attached or plugged into the computer system 700 for various reasons such as location determination, security, inventory, etc.

Embodiments of the present invention may provide power-on and power-off RFID tag access. For example, embodiments of the present invention may provide power-on and power-off server location determination (or other component location determination). Additionally, various information may be updated on the RFID tag by using an auxiliary interface device and/or I/O pins. This allows the information stored on the RFID tag to be kept current and up-to-date. Additional security information may also be added to the RFID tag using the auxiliary interface device and/or the I/O pins.

Embodiments of the present invention may be applicable in numerous environments as will be discussed below merely as examples. Other embodiments, environments and applications are also within the scope of the present invention. Embodiments of the present invention may be provided within or as part of shipping containers. That is, a battery powered product may monitor conditions of the container. The RFID reader that reads the presence of the container may simultaneously (or substantially simultaneously) read out environmental history (e.g. temperature, shock, humidity, time of events, etc.) as well as other information stored at the origin of the shipping. Embodiments of the present invention may also be applicable to sensor network motes such as low or ultra low power sensors that make measurements and store the measured data with a periodicity in the RFID tag's non-volatile memory. The data may eventually be read and the memory may be cleared at that point.

Still further, embodiments of the present invention may also be applicable for security/authentication for wireless Universal Serial Bus (USB) applications. For example, embodiments of the present invention may include an RFID tag integrated into a peripheral to enable enhanced security. Key exchange and rotating authenticity codes may also enhance security.

Embodiments of the present invention may also be applicable to laptop wireless fidelity (WiFi) applications. More specifically, an RFID tag in a laptop in a briefcase may be powered down and carried through a security portal. The security portal may read both an employee's badge number and the laptop's RFID tag. The system may compare the RFID tag's serial number to its active computer database and if it is enabled, then write a Wired Equivalent Privacy (WEP) decryption key to the tag's non-volatile memory. Thus, the next time the laptop is turned on, the laptop may have access to specific sites based on the portals in which the tag has passed.

Systems represented by the various foregoing figures can be of any type. Examples of represented systems include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method operations may have been delineated as separate operations; however, these separately delineated operations should not be construed as necessarily order dependent in their performance. That is, some operations may be able to be performed in an alternative ordering, simultaneously, etc.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A system comprising:
   a processor;
   a flash memory to couple to the processor;
   a radio frequency identification (RFID) tag; and
   a wired interface to couple the RFID tag to at least the processor, the RFID tag including:
      an antenna to send and receive data across a wireless interface;
      an interface device to couple to the wired interface; and
      a non-volatile memory device to store data, the non-volatile memory device including at least a first port associated with the antenna and a second port associated with the interface device.

2. The system of claim 1, wherein the interface device includes a communication link to communicate data to and from the non-volatile memory device.

3. The system of claim 2, wherein the interface device includes a power link to provide power to the RFID tag.

4. The system of claim 1, wherein the non-volatile memory device to store the data received from the interface device when the RFID tag is in a passive mode.

5. The system of claim 1, wherein the processor to read the data from the non-volatile memory device and across the interface device when the RFID tag is in a passive mode.

* * * * *